United States Patent [19]

Daoud

[11] Patent Number: 5,004,433
[45] Date of Patent: Apr. 2, 1991

[54] INTERCONNECTION DEVICE
[75] Inventor: Bassel H. Daoud, Parsippany, N.J.
[73] Assignee: AT&T Bell Laboratories, Murray Hill, N.J.
[21] Appl. No.: 399,644
[22] Filed: Aug. 28, 1989
[51] Int. Cl.⁵ .......................................... H01R 11/05
[52] U.S. Cl. ................................... 439/502; 439/460
[58] Field of Search ............. 439/493, 499, 502, 417, 439/456–460, 496, 498

[56] References Cited

U.S. PATENT DOCUMENTS

| | | |
|---|---|---|
| 4,655,521 | 4/1987 | Thomas . |
| 4,688,872 | 8/1987 | Pohl . |
| 4,780,094 | 10/1988 | Batty et al. .................. 439/502 X |
| 4,781,618 | 11/1988 | Geib et al. .................. 439/417 X |
| 4,799,903 | 1/1989 | Deurloo . |
| 4,871,326 | 10/1989 | Coon ............................ 439/502 |

Primary Examiner—Eugene F. Desmond
Attorney, Agent, or Firm—L. H. Birnbaum

[57] ABSTRACT

Disclosed is an integral connector unit for use primarily as a network interface. The unit combines a connection to customer premises equipment either in the form of screws or self-strip terminals, an RJ11 plug, and a strain relief member for the plug. Latching means are also included for snapping the circuit into the chassis of a terminal housing.

7 Claims, 3 Drawing Sheets

INTERCONNECTION DEVICE

BACKGROUND OF THE INVENTION

This invention relates to interconnection devices, and in a particular embodiment, to a device at a network interface between the telephone company and customer premises equipment.

One of the requirements imposed on telephone companies in recent years is that some division be made between the network owned by the telephone company and that owned by the individual customers. Since the customer now, typically, owns the wires and equipment on his or her side of the network interface, it is important to be able to determine whether a problem in telephone service exists in the telephone company network or in the customer's wires or equipment. In the case of buildings with several units, this problem is met by a building entrance terminal which includes an array of bridges coupled to each customer in the building. Each bridge is coupled to the netwrok through a standard RJ11 plug so that the customer can disconnect his premises equipment and plug a working telephone directly into the network for testing purposes. Thus, if service continues to be impaired during the test, the customer knows the problem is in the network and it is the responsibility of the telephone company to repair.

Interconnection devices presently employed at the network interface typically include a bridge in the form of a pair of screws within a plastic housing, a pair of wires coupled to the screws and terminating at the other end in the RJ11 plug, and a separate strain relief member for the wires. The present devices, while adequate, are also expensive since they involve a fair amount of assembly time.

It is, therefore, an object of the invention to provide a less costly interconnection device.

SUMMARY OF THE INVENTION

This and other objects are achieved in accordance with the invention, which is an interconnection device comprising means for electrically coupling the device to an outside circuit, the means being disposed within an insulating housing. A pair of wires have ends connected to the said means, and opposite ends terminating in a plug member adapted for insertion in a socket to provide electrical connection to another outside circuit. A recess is included in the housing adjacent to the said means. This recess includes a portion of the wires so as to provide strain relief for the wires.

BRIEF DESCRIPTION OF THE DRAWING

These and other features of the invention are described in detail in the following description. In the drawing.

It will be appreciated that, for purposes of illustration, these figures are not necessarily drawn to scale.

DETAILED DESCRIPTION

Figure 1:
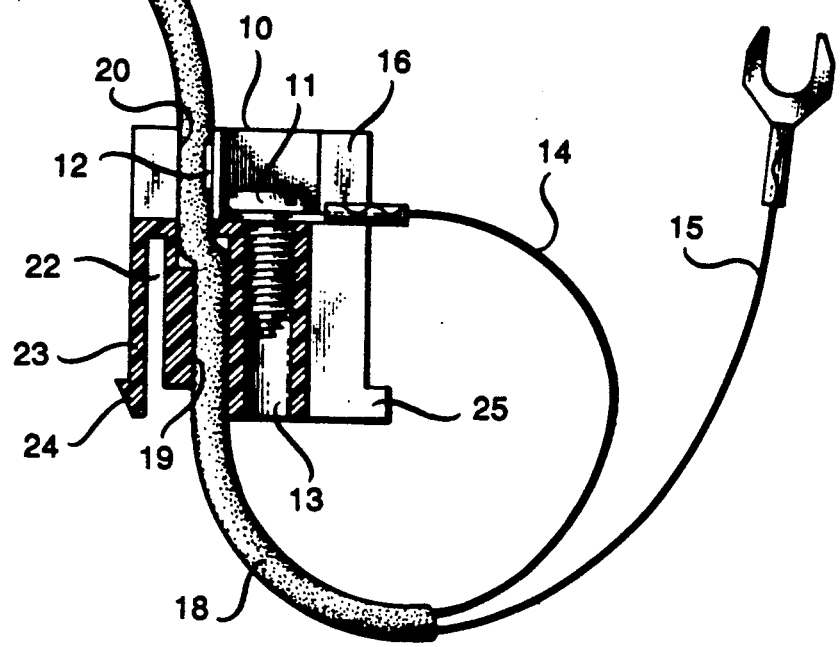
FIG. 1 is a cross sectional of a device in accordance with an embodiment of the invention.
Figure 2:
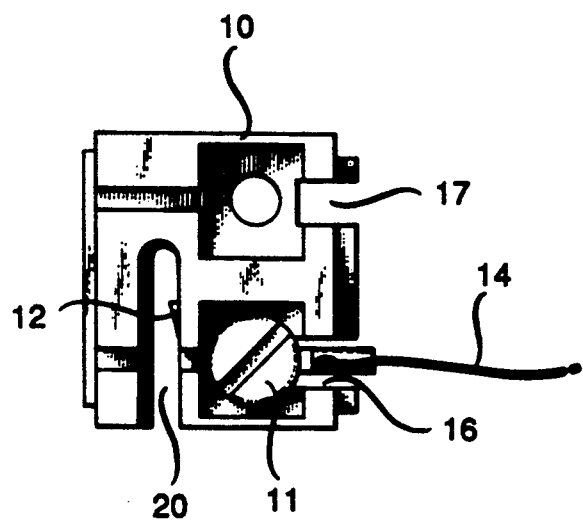
FIG. 2 is a top view of the device of FIG. 1.
Figure 3:
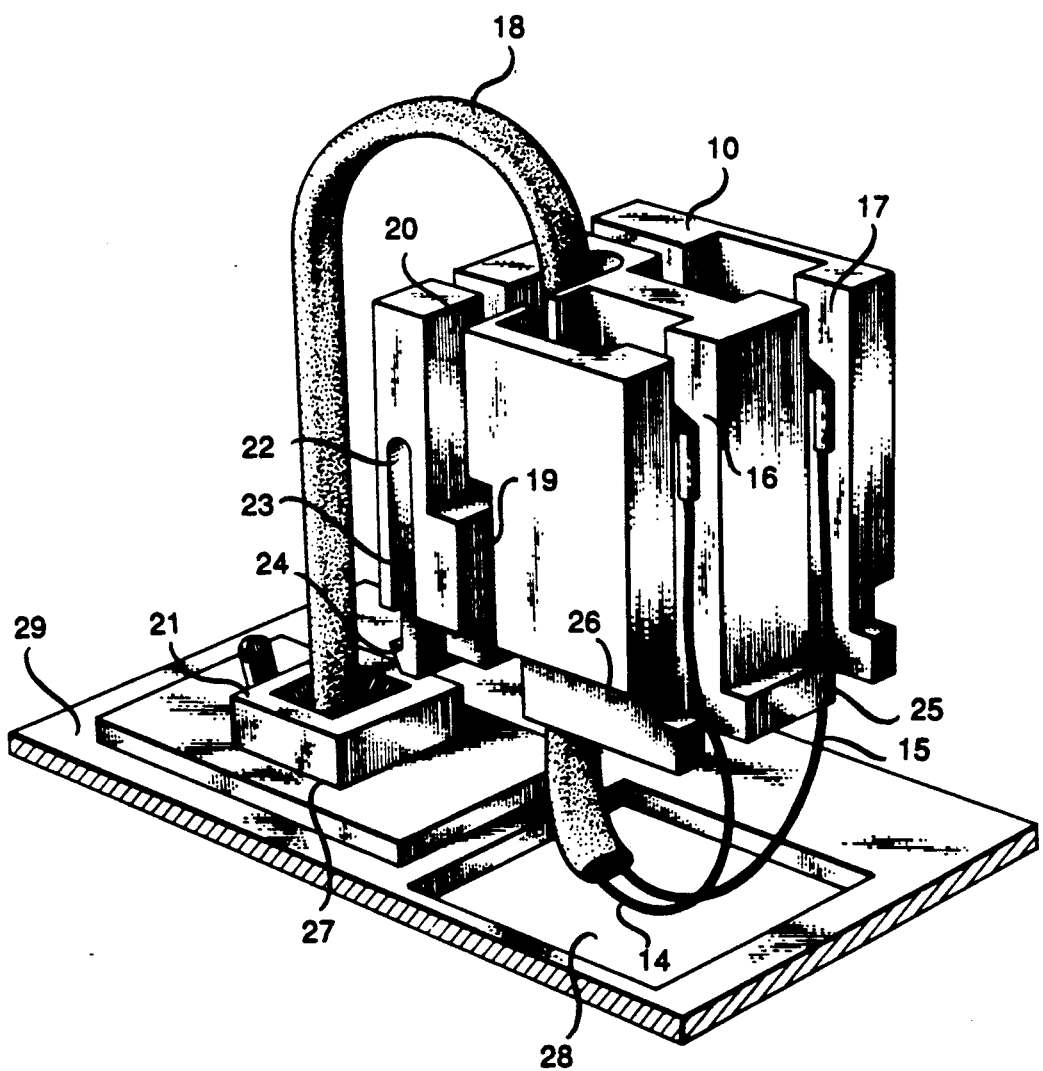
FIG. 3 is a perspective view of the device in accordance to FIG. 1 further illustrating a portion of a chasis in which the device is mounted.

FIGS. 1, 2 and 3 illustrate an embodiment of the invention. The device includes an insulating housing, 10, typically made of plastic and formed in an essentially cubic configuration. Means are secured within the housing for making electrical contact to an outside circuit, which in this example would be the customer premises equipment. The means in this embodiment are a pair of screws, one of which is shown as 11, threaded into holes eg, 13, in the housing. Preferably, the heads of the screws are recessed from the top of the housing in order to prevent accidental contact therewith by the customer. Coupled to the screws are a pair of wires, 14 and 15, which extend from the screws through recesses, 16 and 17, in the side of the housing to an area beneath the housing. The wires curve in this area and extend back into the housing. The portion of the wires which re-enters the housing is covered by a protective jacket, 18, which is typically made of polyvinylchloride.

The wires re-enter the housing at recess, 19, and extend through recess, 20, which is offset with respect to recess, 19. (FIG. 2 omits the wires at this point to more clearly illustrate the shape of the recess, 20.) The size and shape of the recesses, 19 and 20, are chosen to tightly hold the protective jacket, 18, and to prevent excessive bending of the jacket and wires, thus providing strain relief. In this example, each opening was approximately 0.1 inches wide and extended into the housing approximately 0.36 inches. Recess, 20, was offset with respect to recess, 19, by approximately 0.05 inches. As shown, the recesses, 19 and 20, are located adjacent and extend essentially parallel to the screws, eg 11. Also included within the recess, 20, is a protrusion, 12, from the housing which aids in holding the wires within the recesses 19 and 20.

The protective jacket, 18, emerges from opening, 20, at the top of the housing and the wires therein terminate in a standard RJ11 plug, 21. This plug is adapted for insertion into a socket (27 of FIG. 3) so that the wires make electrical connection to another outside circuit which in this example would be the telephone network.

A further recess, 22, is formed in the bottom surface of the housing essentially parallel to recesses, 19 and 20, so as to form a cantilever element, 23, which is an integral part of the housing. This element extends approximately to the bottom surface of the housing and has a tip, 24, which is capable of latching the housing into the chassis of a terminal. On the surface of the housing opposite to the cantilever element is a lip, 25, which, together with the cantilever element, secures the connector in the hole of the chassis. Mounting is accomplished by first placing the lip into the hole (28 of FIG. 3) and then rotating the connector housing so that the lip is secured under one side of the hole while the cantilever element is bent inward by the other side of the hole, and ultimately the tip, 24, is secured under the other side of the hole. Removal of the unit will be prevented by the tip and lip until the cantilever element is squeezed by hand. The unit will rest with shoulders, 26, of the housing in contact with the surface of the chaisis, 29. The plug, 21, fits within a socket, 27, as previously mentioned.

It should be noted that the chassis includes several of the interconnecting devices and at least a portion of the outside circuitry to which the devices are electrically connected, usually in the form of wires (not shown) coupled to the screws, eg 11.

Thus, by combining a strain relief and latching element into a single housing which also includes the bridge and plug, the interconnection devices of the present invention can be assembled into a building entrance terminal or other equipment faster than generally possible in the prior art. This decrease in assembly time, as well as the reduction in piece parts, permits the terminal to be made at a fraction of its present cost.

Figure 4:
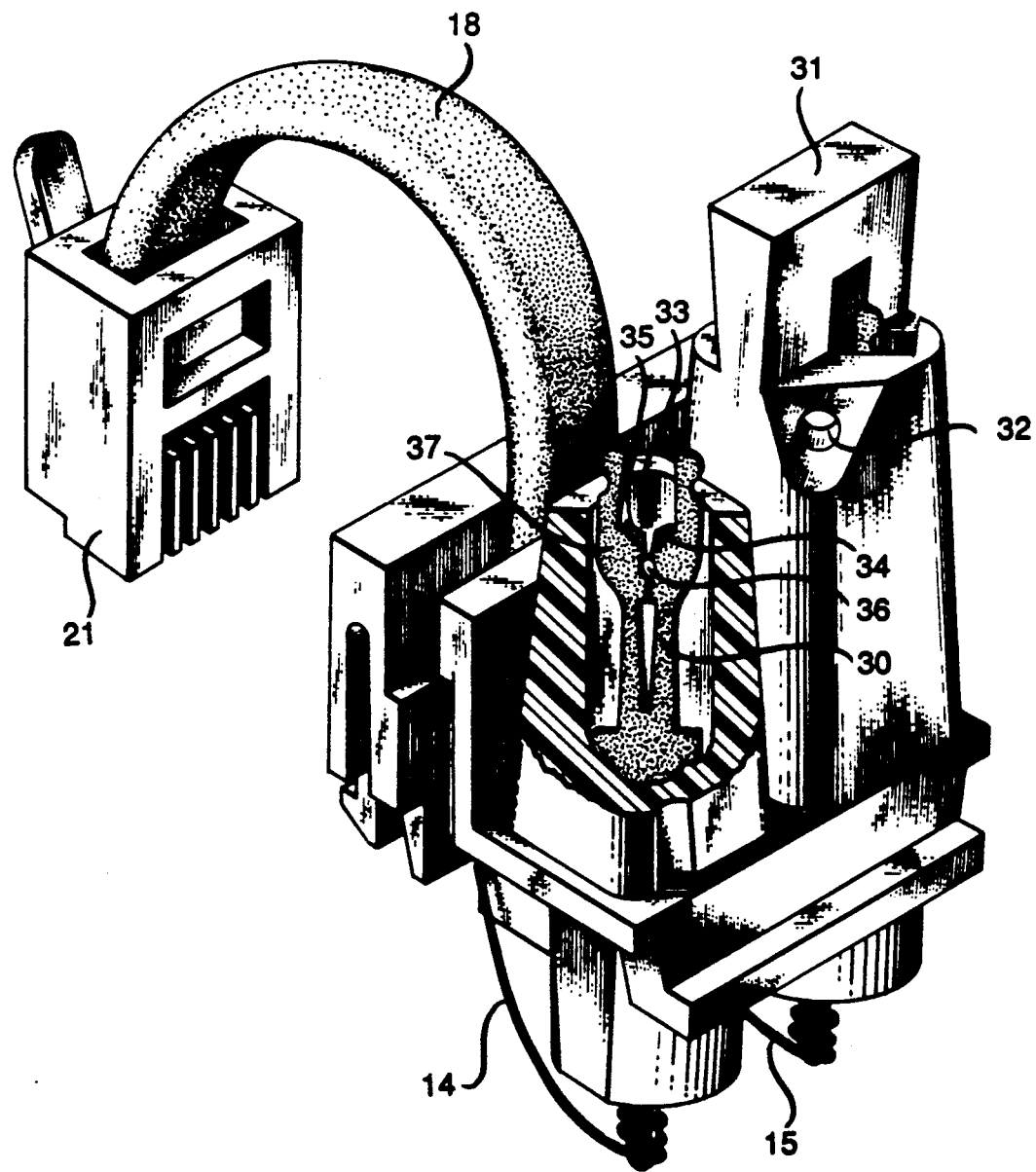
FIG. 4 is a perpective view, partly cut away, of a device in accordance with a further embodiment of the invention.

FIG. 4 illustrates another embodiment of the invention. Here, the means for coupling the device to the customer equipment is a pair of self-strip terminals rather than a pair of screws. The self-strip terminals each include a connector element, one of which is shown as 30, surrounded by a cap (eg, 31) which is slidably mounted over the connector element. Each cap includes an entrance hole (eg, 32) and an exit hole (not shown) on opposite surfaces of the cap for threading a wire from the ouside circuitry therethrough. Electrical connection to wires, 14 and 15, from the plug, 21, is made by wrapping the wires around the bottom of the connector elements as shown. (For a complete discussion of a self-strip terminal, see U.S. patent application Ser. No. 373,864 filed Jun. 29, 1989 and assigned to the present asignee.)

The interconnection of FIG. 4 can be inserted into the chasis as before. Electrical connection to the outside circuitry is made by coupling a pair of wires to associated connector elements as hereinafter described. The cap, 31, surrounding the connector element, 30, is raised from the position shown in FIG. 4 and a wire inserted through the pair of holes (eg, 32) in that cap. The position of the holes is such that the wire will extend through the opening, 33, at the top of the connector. When the cap is pushed down to its resting position, the wire will be forced between a pair of blades, 34 and 35, which cut through the insulation surrounding the wire, and the wire will be secured between the tynes, 36 and 37, of the connector.

Various additional modifications will become apparent to those skilled in the art. All such variations which basically rely on the teachings through which the invention has advanced the art properly considered within the scope of the invention.

What is claimed is:

1. An interconnection device comprising:
   means for electrically coupling the device to an outside circuit, said means disposed within an insulating housing;
   a pair of wires with ends connected to said means an opposite ends terminating in a plug member adapted for insertion in a socket to provide electrical connection to another outside circuit; and
   a recess within said housing adjacent to said means and including therein a portion of said wires so as to provide strain relief for said wires, the recess including a section extending from a top surface of the housing and a section extending from a bottom surface of the housing and where the recesses are offset in the direction from the bottom to the top surface so as to engage and deform the cable into a serpentine configuration to provide strain relief.

2. The device according to claim 1 wherein the said means is pair of screws located within holes in the housing.

3. The device according to claim 2 wherein the screws have heads and the heads are recessed from the top surface of the housing.

4. The device according to claim 1 further including a cantilevered member adapted for latching the device in a hole within a chassis.

5. The device according to claim 4 further comprising a lip portion on a surface of the housing opposite to said cantilever member for engaging a portion of said hole in combination with said cantilever member.

6. The device according to claim 1 wherein the said means is a pair of terminals each comprising a connector element with a cap slidably mounted thereover, said cap including a pair of holes for insertion of one of said wires therein.

7. The device according to claim 1 wherein said recess is adjacent to and essentially parallel with said means.

* * * * *